United States Patent [19]
Reusche et al.

[11] Patent Number: 6,084,209
[45] Date of Patent: Jul. 4, 2000

[54] HEATED PET BED

[75] Inventors: Thomas K. Reusche, Elburn; Donald B. Owen, Batavia; Joe Blahnik, St. Charles, all of Ill.

[73] Assignee: Allied Precision Industries Inc., Elburn, Ill.

[21] Appl. No.: 09/256,662

[22] Filed: Feb. 24, 1999

[51] Int. Cl.[7] ...................................................... H05B 1/00
[52] U.S. Cl. .......................... 219/217; 219/217; 219/212; 392/435
[58] Field of Search ..................................... 219/217, 212, 219/211, 530, 540, 544, 460.1, 461.1; 392/435, 432; 338/285, 306, 315; 119/28.5

[56] References Cited

U.S. PATENT DOCUMENTS

| | | | |
|---|---|---|---|
| 2,162,287 | 6/1939 | Smith | 219/524 |
| 2,195,958 | 4/1940 | Kearsley . | |
| 2,961,524 | 11/1960 | Newman . | |
| 3,125,663 | 3/1964 | Hoffman . | |
| 3,380,087 | 4/1968 | Petty et al. . | |
| 3,427,431 | 2/1969 | Costanzo . | |
| 3,648,469 | 3/1972 | Chapman . | |
| 4,031,352 | 6/1977 | Oosterberg . | |
| 4,257,349 | 3/1981 | Carlin | 119/1 |
| 4,332,214 | 6/1982 | Cuningman . | |
| 4,574,186 | 3/1986 | Sakai et al. | 219/528 |
| 4,820,903 | 4/1989 | Ishida | 219/213 |
| 5,261,352 | 11/1993 | Stammelman . | |
| 5,371,340 | 12/1994 | Stanfield | 219/217 |
| 5,606,639 | 2/1997 | Lehoe et al. | 392/353 |

FOREIGN PATENT DOCUMENTS 1-124993  5/1989  Japan .

*Primary Examiner*—Teresa Walberg
*Assistant Examiner*—Shawntina Fuqua
*Attorney, Agent, or Firm*—McAndrews, Held & Malloy, Ltd.

[57] ABSTRACT

A heating pad for animals consisting of a plastic housing and an electric heating element. The base of the housing contains conical supports upon which the heating element rests. The heating element is supported in the housing to provide air gaps above and below the heating element, allowing an even temperature throughout the housing. This prevents regions of localized heat on the top of the bed, and also prevent unnecessary heating of the base. This temperature is regulated by a thermostat that shuts down the heating element if the temperature of the air within the chamber exceeds the preset limit. The conical supports also provide structural support, preventing the top of the bed from collapsing on top of the heating element when subject to the weight of an animal.

11 Claims, 3 Drawing Sheets

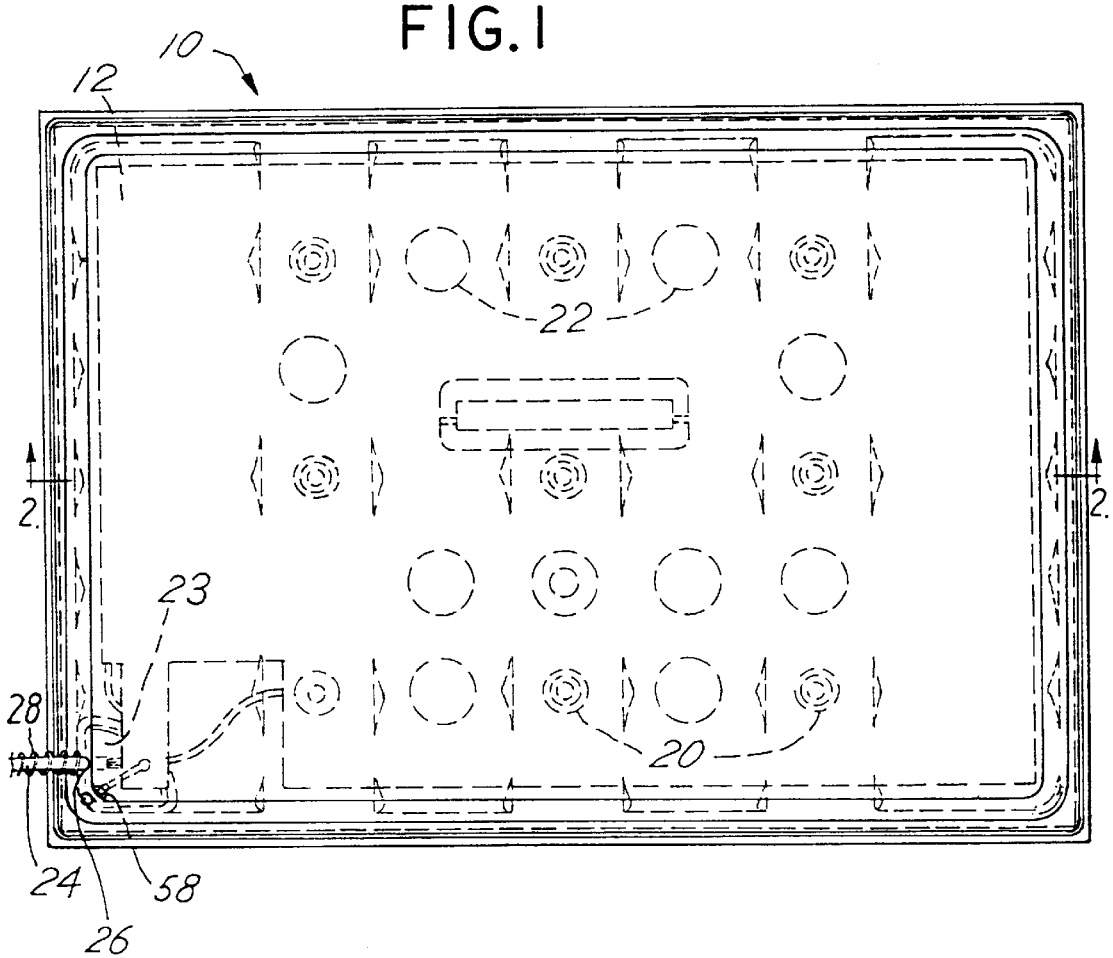
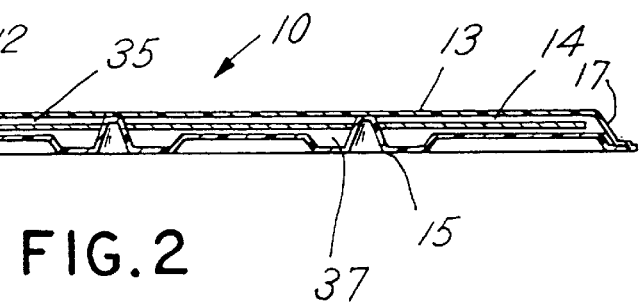

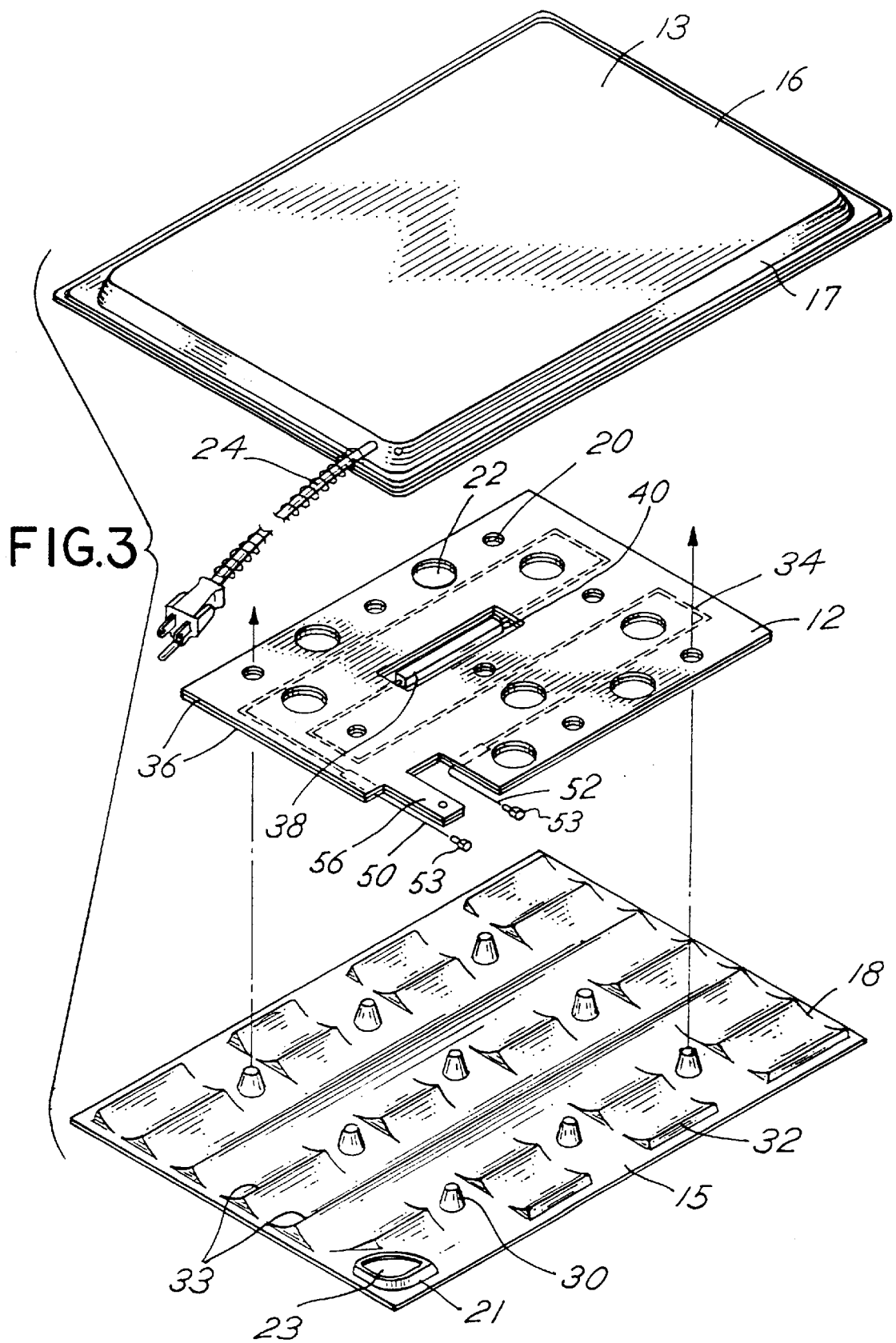

HEATED PET BED

CROSS-REFERENCE TO RELATED APPLICATIONS

Not Applicable

FIELD OF THE INVENTION

The present invention relates generally to a heated bed for dogs, cats, or other animals or pets, and more particularly to a heated animal bed with an air gap above and below the heating element to provide uniform heating of the bed without any hot spots.

BACKGROUND OF THE INVENTION

Animals, like humans, require warmth to maintain a constant body temperature. This is especially true when animals are sick or are left outdoors in the cold winter months. However, there are few, if any, safe and convenient devices for this purpose.

Most commercially available heated beds contain electrical heating elements surrounded by insulation and padding, much like heating pads for humans. However, there are several disadvantages when attempting to use these devices with animals. The most obvious danger is that the animal may chew through the padding, exposing the animal to the risk of electrocution.

Another problem with heated animal beds is the likelihood of producing regions of localized heat, often referred to as "hot spots." Unlike humans, who can simply turn down the temperature of a heating pad if it is too hot, animals cannot regulate the temperature of their heated bed. Since this apparatus is used while the animal is asleep, the animal may not even realize that the bed is too hot. This exposes the animal to possible burns, and if severe enough, even death.

Furthermore, "hot spots" are a fire hazard. Pet owners often place bedding on top of the animal bed to provide comfort for the animal. Some bedding sold in pet stores is not capable of withstanding high temperatures. Exposing this bedding to such regions of localized heat may cause it to catch fire.

Prior commercial products have attempted to solve this problem by embedding the heating element in plastic. However, this greatly lowers the efficiency of the heater, thereby increasing the cost of operating the bed. Other products have attached the heating element to the base of the bed. This leaves a gap between the top of the bed and the heating element which can be filled with air or water. This also lowers the efficiency of the heater because much of the heat is transmitted to the base, thus never reaching the animal. Furthermore, the addition of water adds a substantial amount of weight to the bed, making it less mobile.

SUMMARY OF THE INVENTION

The above-identified problems of prior heated animal beds are eliminated by the present invention. The present invention consists of an electric heating element within a plastic housing. The housing has conical supports which protrude upward from the base that provide structural support and help locate the heating element. Rather than attaching the heating element to the top or bottom of the housing, the heating element rests on these supports and wave-shaped supports formed on the bottom wall of the housing. This provides an air gap above and below the heating element, thereby producing a thermal chamber around the heating element. Holes in the heating element permit air to circulate between the upper and lower air gaps, thereby maintaining a generally uniform air temperature throughout the chamber. The heating element contains a thermostat that permits the flow of energy through the heater only when this air temperature is below a preset limit.

Accordingly, the objectives of this invention are to provide, inter alia, a heated animal bed that:

1) is of rugged and durable construction;
2) is lightweight and mobile;
3) may be used with a wide variety of bedding; and
4) through the use of air gaps above and below the heating element eliminates hot spots on the top surface of the bed while limiting the heat transfer to the base.

One or more of the preceding objectives, or one or more other objectives that will become plain upon consideration of the present specification, are satisfied by the invention described herein.

BRIEF DESCRIPTION OF THE DRAWINGS

The manner in which these objectives and other benefits can be obtained from the present invention is explained in the following specification and attached drawings in which:

FIG. 1 is a plan view of the preferred embodiment of the invention with internal structure and heating element shown in broken lines;

FIG. 2 is a cross-sectional view taken along line 2—2 in FIG. 1;

FIG. 3 is an exploded view showing the placement of the heating element between the upper and lower sections of the housing;

DETAILED DESCRIPTION OF THE DRAWINGS

Figure 4:
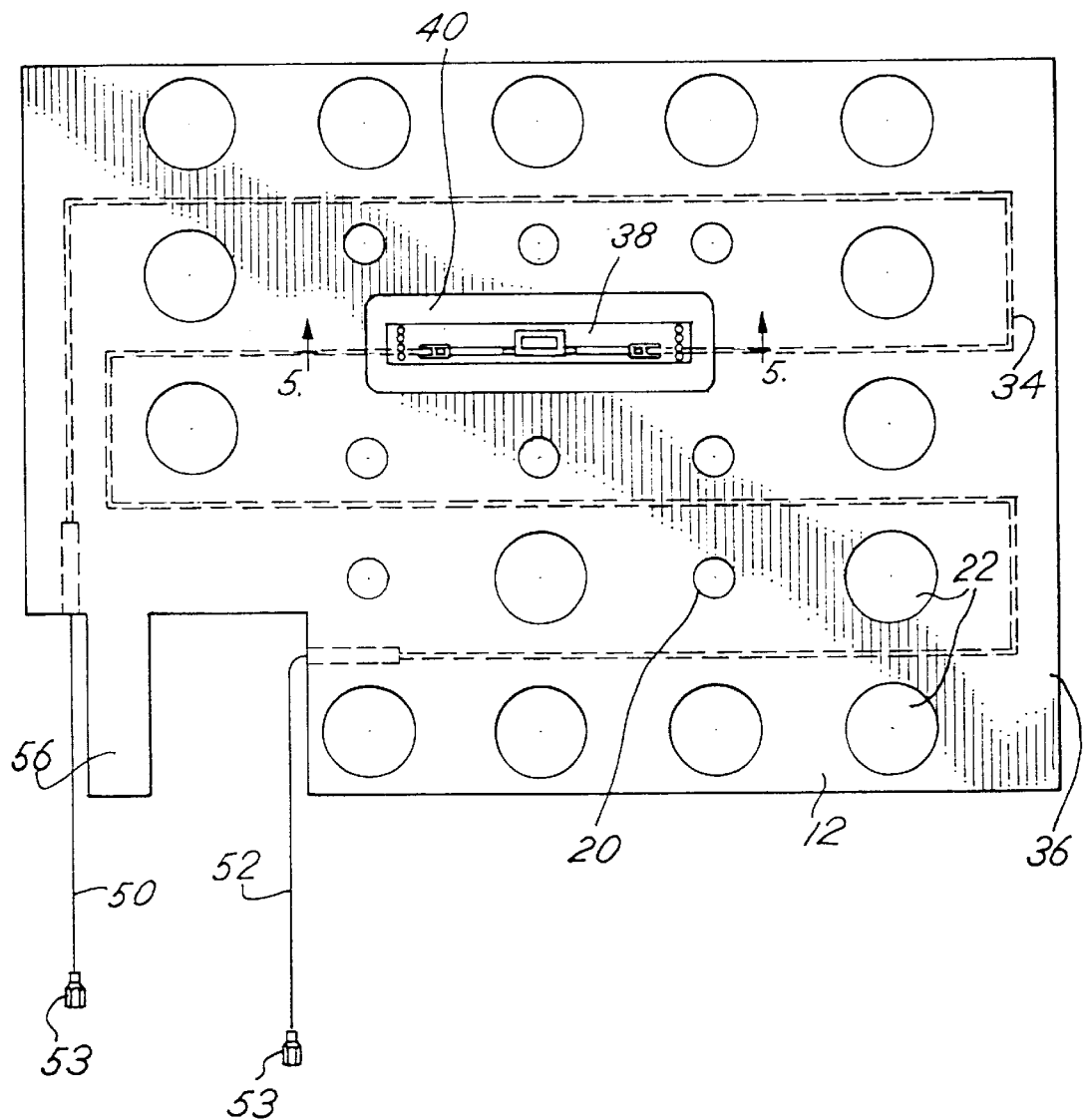
FIG. 4 is a plan view of the heating element.

The preferred embodiment of the heated animal bed 10 is generally illustrated in FIG. 1. The bed 10 consists of a heating element 12 mounted inside a hollow housing 14 formed of a top portion 16 bonded to a bottom portion or base 18 around its periphery. The top portion 16 and the base 18 are molded from a suitable plastic such as ABS plastic. The junction between the housing portions 16, 18 is sealingly joined using methyl ethyl keyatone ("MEK") to prevent water from entering the inner cavity. The top and bottom portions 16, 18 define a top wall 13, a bottom wall 15, and a side wall 17 extending between the top and bottom walls. The housing walls 13, 15, 17 define an internal chamber 19 which houses the heating element 12. The top wall 13 is generally flat, providing a level surface on which the animal may lay. The heating element 12 contains several locating holes 20, as well as air circulation holes 22.

The heating element 12 is connected to a power cord 24 which extends from the heating element 12 through an opening 26 for connection to an electrical outlet. The power cord 24 is protected by a coil spring 28 which prevents the animal from chewing through the power cord 24. The housing base 18 includes an upstanding wall 21 (see FIG. 3) that defines a wiring box 23 where the power cord 24 interconnected to the heating element 12. Power and neutral lead wires 50, 52 extend from the heating element 12 and terminate in connectors 53. The connectors 53 extend into the wiring box 23 where they are interconnected with reciprocal connectors on the distal ends of the power and neutral conductors of the power cord 24. The heating element 12 includes a grounding leg 56 which extends into the wiring box 23. The ground wire from the power cord 24 is interconnected with the coil spring 28 and the grounding leg 56 by a bolt and nut combination 58. The bolt extends through the housing side wall 17, through a loop on the end of the coil spring 28, through a connector loop on the distal end of the ground wire, and then through an opening on the grounding leg 56. The nut threads onto the distal end of the bolt to hold the ground wire, the coil spring and the grounding leg 56 in place on the bolt. The wiring box 23 is filled epoxy to prevent moisture infiltration into the housing 14.

As seen in FIG. 2, a plurality of conical supports 30 extend upwardly from the base 18. The upper ends of the supports 30 engage against the top wall 13 to prevent it from collapsing under the weight of an animal. Preventing contact between the top layer 16 and the heating element 12 further prevents hot spots. The conical supports 30 are also configured to support the heating element 12 within the housing. In particular, the diameter of the top of the conical supports 30 is less than the diameter of the locating holes 20 of the heating element 12, while the diameter of the base of the conical supports 30 is greater than the diameter of the locating holes 20. This allows the locating holes 20 to be slid down onto the conical supports 30 until they engage around the supports.

As seen in FIG. 3, the base 18 also has several wave-shaped supports 32. The wave-shaped supports 32 add structural rigidity to the housing 14. Additionally, the upper edges 33 (or crests) of the wave-shaped supports 32 engage against the heating element to support it above the bottom wall 15. Mounting the heating element 12 in this manner produces air gaps 35, 37 above and below the heating element 12. (The lower air gaps 37 are defined in part by the troughs of the wave-shaped supports 32).

The bed is designed to maintain a uniform internal air temperature by encouraging air circulation within the internal chamber 19. In this respect, the heating element 12 has a smaller outer periphery than the top portion 16 and the base 18. As a result, there is a gap (on the order of 0.5 to 1.0 inches) between the heating element 12 and the side wall 17. (See FIGS. 1 and 2). This gap permits air to circulate around the heating element 12. Air also circulates through the circulation holes 22 located in the heating element 12. This design results in a uniform air temperature within the housing 14 without unnecessarily heating the base 18.

Figure 5:
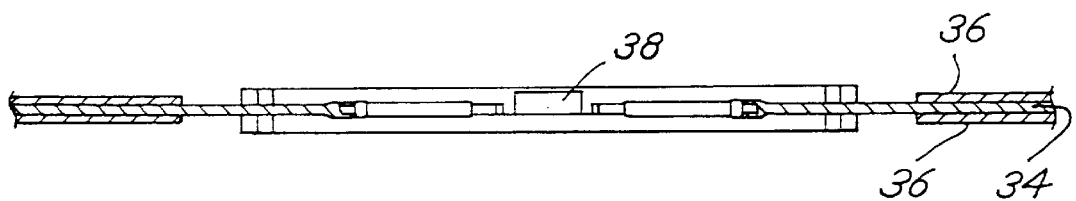
FIG. 5 is a cross-sectional view taken along line 5—5 in FIG. 4.

The heating element 12 preferably consists of a heating coil 34 sandwiched between two sheets of foil 36. As seen in FIGS. 4 and 5, a thermostat 38 is connected to the heating coil 34. The thermostat 38 automatically cuts off power to the heating element 14 if the air temperature within the housing 14 exceeds a preset limit. In order to obtain an accurate reading of the air temperature within the housing 14, an air space 40 of ½ inch on all sides of the thermostat 38 is cut out of the foil 36. The thermostat 38 is placed in the center of the heating element 12 but, because air circulation results in a uniform air temperature, it could be placed elsewhere in the housing 14. The thermostat 38 is sleeved and sealed from moisture to protect the bed 10 from electrical "shorts" in the event the outer plastic would develop a repture.

The bed 10 surface is designed to reach temperatures in the mid to low 90's. Under cold conditions, heat will dissipate until an animal lays on the bed 10. The animal will trap the heat and also generate more heat via its body heat. Since there is an air gap between the heating element 12 and plastic housing, the bed 10 may be covered with any type of material without concern for hot spots. If the bed 10 is partially covered (leaving the thermostat uncovered), the uncovered area will generally be within 10° F. of the covered area due to the internal air circulation properties of the bed 10. By contrast, in prior art devices, this partially covered/ uncovered scenario could result in warping and/or melting of the housing because the uncovered thermostat would continue to operate without sensing the much hotter covered plastic surface. Moreover, since the heating element 12 is not fastened to the upper or lower surface in the present design, the plastic housing 14 is protected against warping or melting in the event of a thermostat failure.

While this invention has been described in connection with one or more embodiments, it will be understood that this invention is not limited to those embodiments. On the contrary, the invention includes all alternatives, modifications, and equivalents appreciated by those skilled in the art as may be included within the spirit and scope of the claims below.

What is claimed is:

1. A heated animal bed comprising:
    a housing having a top wall, a bottom wall, and side walls connecting the top and bottom walls, the housing defining an inner cavity;
    a heating element mounted in said inner cavity such that air gaps exists between the heating element and both the top and bottom walls of the housing;
    said heating element containing a plurality of holes to permit air circulation between said upper and lower air gaps; and
    a power cord extending from the housing and being interconnected with the heating element for delivering electrical power thereto.

2. A heated animal bed as set forth in claim 1, further comprising a thermostat to regulate the temperature of the inner cavity.

3. A heated animal bed as claimed in claim 1, further comprising a plurality of support posts which extend upwardly from the bottom wall, through the heating element and engage against the top wall in a supporting relationship.

4. A heated animal bed as set forth in claim 3, wherein the heating element has a plurality of locating holes configured to align with and slide onto the support posts.

5. A heated animal bed comprising:
    a housing having a top wall, a bottom wall, and side walls connecting the top and bottom walls, the housing defining an inner cavity;
    a heating element mounted in said inner cavity such that air gaps exists between the heating element and both the top and bottom walls of the housing;
    a plurality of wave-shaped supports formed in the bottom wall of the housing, the wave-shaped supports being adapted to support the heating element and to define an air gap between the heating element and the housing bottom wall; and
    a power cord extending from the housing and being interconnected with the heating element for delivering electrical power thereto.

6. A heated animal bed as claimed in claim 1, wherein the heating element is a foil heater.

7. A heated animal bed comprising:
    a housing having a top wall, a bottom wall, and side walls connecting the top and bottom walls, the housing defining an inner cavity, and the bottom wall containing upward supports;

a foil heating element in the inner cavity, the heating element supported in the housing such that air gaps exists between the heating element and both the top and bottom walls of the housing;

the foil heating element containing holes which allows air to circulate between the upper and lower air gap;

a thermostat to regulate the temperature within the inner cavity; and a power cord extending from the housing and being interconnect with the heating element for delivering electrical power thereto.

8. A heated animal bed as claimed in claim 5, further comprising a plurality of support posts which extend upwardly from the bottom wall and engage against the top wall in a supporting relationship.

9. A heated animal bed as claimed in claim 5, further comprising a thermostat to regulate the temperature of the inner cavity.

10. A heated animal bed as claimed in claim 5, wherein said heating element includes a plurality of air circulation holes to permit air circulation between said air gaps.

11. A heated animal bed as claimed in claim 5, wherein said heating element is a foil heater.

* * * * *